United States Patent [19]

Mizutani

[11] Patent Number: 5,381,415
[45] Date of Patent: Jan. 10, 1995

[54] CALL COLLISION SIDESTEP SYSTEM FOR TWO-WAY SIMULTANEOUS CALLS IN AN ISDN NETWORK

[75] Inventor: Yasunao Mizutani, Kawasaki, Japan

[73] Assignee: Fujitsu Limited, Kawasaki, Japan

[21] Appl. No.: 87,351

[22] Filed: Jul. 8, 1993

Related U.S. Application Data

[63] Continuation of Ser. No. 778,484, Oct. 17, 1991, abandoned.

[30] Foreign Application Priority Data

Oct. 18, 1990 [JP] Japan ................................. 2-280494

[51] Int. Cl.$^6$ .............................................. H04J 3/12
[52] U.S. Cl. ................................... 370/110.1; 379/350
[58] Field of Search ............... 379/251, 257, 258, 350, 379/352

[56] References Cited

U.S. PATENT DOCUMENTS

| 4,574,164 | 3/1986 | Orikasa | 379/63 |
| 4,899,374 | 2/1990 | Van Landeghem | 379/208 |
| 5,123,042 | 6/1992 | Saegusa et al. | 379/63 |

Primary Examiner—Wellington Chin
Assistant Examiner—Hassan Kizou
Attorney, Agent, or Firm—Staas & Halsey

[57] ABSTRACT

A method of controlling a network including first and second terminals connected to the network. The method responds to a call collision state in which the first terminal transmits a corresponding connect request to the network for connection to the second terminal and, simultaneously, the second terminal transmits a corresponding connect request to the network for connection to the first terminal. The method includes the steps of withdrawing from the network the corresponding connect request from one of the first terminal and the second terminal while maintaining the corresponding connect request from the other of the first and second terminals; transmitting a relayed connect request from the network to the one of the first terminal and the second terminal for which the connect request was withdrawn; transmitting a connect allowance signal from the network to the one of the first and second terminals for which the connect request was maintained; and connecting the first terminal and the second terminal together through the network.

3 Claims, 4 Drawing Sheets

CALL COLLISION SIDESTEP SYSTEM FOR TWO-WAY SIMULTANEOUS CALLS IN AN ISDN NETWORK

This application is a continuation of application Ser. No. 07/778,484, filed Oct. 17, 1991, now abandoned.

BACKGROUND OF THE INVENTION

1. Field of the Invention

The present invention relates to a call collision sidestep system which carries out connections in response to simultaneous call requests between opposed communication equipment units, such as terminal equipment units, in an exchange service of an integrated services digital network (ISDN).

2. Description of the Related Art

A plurality of switched line services are supplied, in a switched line applicable to data communication, and an exchange service in ISDN networks is utilized as one such service.

In general, communication equipment in use for exchange services is connected with other ("opposed") such equipment, which communicate with each other utilizing exchange services, to effect communication at a time when a call request is produced.

the above exchange services are often employed for an emergency backup or the like and, in such a circumstance, the time duration from an occurrence of a connect request to a connect terminate (in a state of data set available) is required to be curtailed.

Nevertheless, in such an above-described ISDN network or in a public switched telephone network (PSTN), when the communication equipment units each internally carry out a connect request to a distant station and two such distant, or opposed, units do so simultaneously, a collision of the incoming call from the one unit with the outgoing call from the other unit occurs, and prevents establishing the requested connection.

For this reason, even if the communication equipment unit internally carries out a connect request to distant station equipment simultaneously, it is required to use a method that can sidestep the collision of incoming and outgoing calls and connect with any opposed unit between the communication equipment units.

In a conventional method, when two communication equipment units connected with an ISDN network carry out respective connect requests to the opposed equipment unit simultaneously, both communication equipment units are put in an answer waiting state with respect to the opposed station, relative to a call setup signal outgoing from an intra-office station, and each is in a state such that a network connection does not terminate (i.e., as would occur in a state that a collision of the incoming and outgoing calls has occurred).

When such a call collision occurs, a connect request is withdrawn using conventional methods and, after a definite time lapse, a connect request is made again.

Among the above-described methods for determining a definite time, a first method is such that the time lapse is determined by each communication equipment unit in a pseudo-random way and a second method is such that different definite time lapses are determined in advance to set up the calls between the respective communication equipment units and each thus is able to connect with the other, or the like.

Concerning the above first method, there is a problem that, whenever an incoming and outgoing call collision occurs, a retry (i.e., call abort signal and re-transmission of the outgoing signal) is repeated, every time, and thus it takes a long time for a connection, a connect time is not specified, and so on.

Concerning the above second method, there is a problem that it is necessary to control the setup time on all the communication equipment units that are connected to the network and thus when the equipment units having a long setup time are connected to each other, it takes a longer time for them to be connected together.

In the prior art, when the communication equipment units are connected with each other and an incoming and outgoing call collision occurs, it takes a long time for one to be connected with another and, as a result, it takes too much time from a communication generation request time to a communication enable time.

Such a state of affairs produces a serious problem in an emergency communication, such as a backup of a based circuit (which is usually used by a leased line), or it enhances deterioration or decline of response characteristics all over the system.

SUMMARY OF THE INVENTION

The present invention is devised to solve the above problems.

An object of the present invention is to provide a call collision sidestep system, in the case of incoming and outgoing calls in an ISDN network, which functions to sidestep an incoming and outgoing call collision between two communication equipment units and to connect the communication equipment units quickly, from the generation time of communication requirements to a communication-enabled state.

In accordance with a feature of the present invention, there is provided a call collision sidestep system, operative during bothway calls in an integrated services digital network (ISDN) and which is connected to the integrated services digital network, providing at least a control operation for the integrated services digital network, and an exchange service of integrated services digital network is adapted to be connected with any line in the system, the system comprising: means for inserting, during an outgoing call, according to a predetermined rule, outgoing and incoming call priority control information into transmission information sent from an outgoing side device to an incoming side device by means of a line exchange operation of the ISDN network; and means for controlling an intra-office outgoing operation, during an incoming call request, by means of incoming and outgoing call priority control information contained in the transmission information, as transmitted and received.

In accordance with another feature of the present invention, there is provided a call collision sidestep system operative during a bothway call in an integrated services digital network (ISDN), connected to the ISDN network, which provides at least a control function for the ISDN network and an exchange service of the ISDN network. The system is adapted to be connected with any line in the ISDN network, wherein the system is adapted to utilize any information capable of communicating with services of the ISDN network, independent of any information communicated between outgoing side equipment and incoming side equipment. The system includes:

means for inserting and transmitting incoming and outgoing call priority control information, during an outgoing call, from the outgoing side equipment to the incoming side equipment according to a predetermined rule; and means for controlling, during an incoming call, an intra-office outgoing operation by means of the received incoming and outgoing call priority control information.

PREFERRED EMBODIMENTS OF THE INVENTION

The present invention will be described in detail hereinafter with reference to a conventional device and method.

Figure 1:
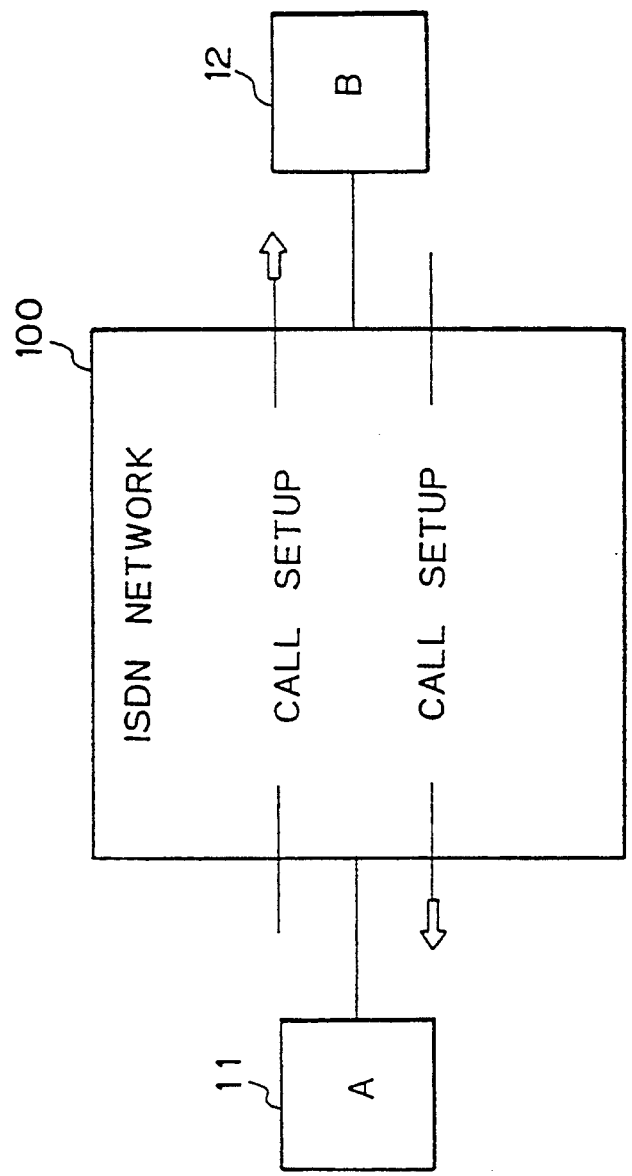
FIG. 1 is a schematic view showing a conventional call collision prevention system.

FIG. 1 is a schematic view showing a conventional call collision prevention system. Reference numeral 100 denotes an ISDN network, and 11 and 12 denote respective, "facing" or "opposed" communication equipment units. When the communication equipment units 11 and 12 transmit respective call request signals simultaneously to each other, i.e., as "opposed" or "mutual" communication equipment units, each is put in an answer waiting state relative to the other opposed station in response to a call setup signal transmitted from each intra-office station and therefore, they are in a state in which a network connection is not completed, that is, in an incoming and outgoing calls collision state.

As described above, hitherto when such a call collision occurs, a connect request signal is withdrawn and, after a definite time has elapsed, a calling party station again delivers a connect request signal.

There are various methods for determining such a definite time. A first method is that the definite time is determined by each communication equipment unit 11, 12 in a pseudo-random way, a second method is that respective, different definite time values are determined in advance and set up for the communication equipment units that are connected to the network.

In the method in which the definite time is determined by each communication equipment unit in a pseudo-random way, there is a problem, that it is possible that an incoming and outgoing calls collision will occur many times over any given time period in a pseudo-random way, and whenever a calls collision occurs, a retry (a call abort and a re-transmission of the outgoing call) is repeated until a connection is completed, and so the connect time cannot be specified.

In the second method in which respective and different definite time values are determined in advance among the communication equipment units that are connected to the network, it is necessary to control the setup time with respect to all the communication equipment units that are connected to the network, and further, it is a problem that when the communication equipment units having a longer setup time are connected to each other, it takes essentially too much time to be connected to the network.

Figure 2:
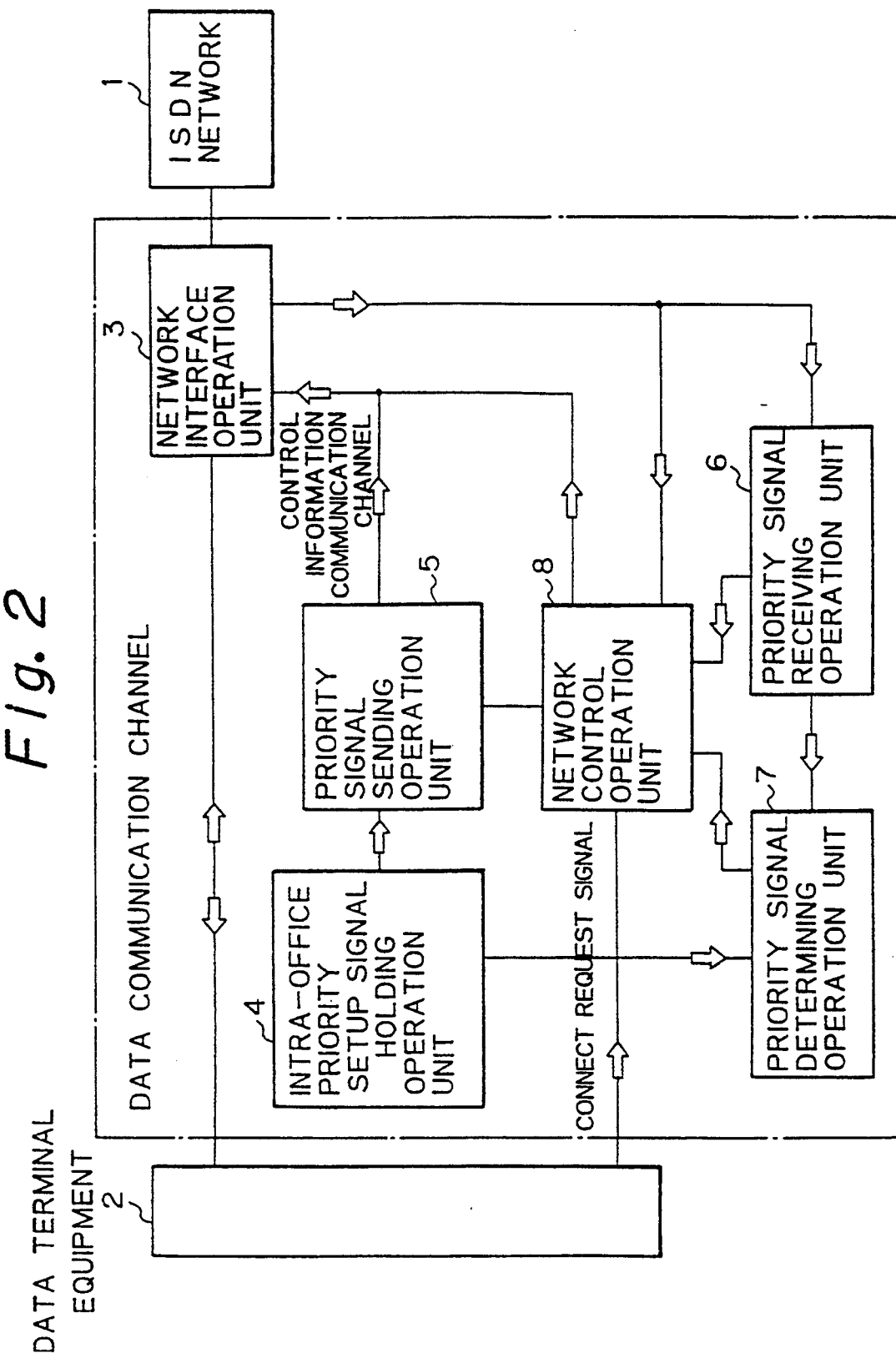
FIG. 2 is a schematic view showing an embodiment of a system in accordance with the present invention.

FIG. 2 is a schematic view showing an embodiment of a configuration of a system in accordance with the present invention.

In FIG. 2, reference numeral 1 denotes an ISDN network, 2 denotes a data terminal equipment, 3 denotes a network interface operation unit, 4 denotes an intra-office station priority setup signal holding operation unit, 5 denotes a priority signal sending operation unit, 6 denotes a priority signal receiving operation unit, 7 denotes a priority signal determining operation unit, and 8 denotes a network control operation unit.

The network interface operation unit 3 is connected with the ISDN network 1 and carries out a protocol control for taking a frame (a set of information elements such as originating or incoming addresses) to pieces and assembly, establishes synchronization, delivers control information, communicates data transmission information from the data terminal equipment 2 and communicates network control information in conjunction with the network control operation unit 8.

The intra-office station priority setup signal holding operation unit 4 holds intra-office station priority setup information and provides intra-office station priority information to the priority signal sending operation unit 5 and to the priority signal determining operation unit 7.

The priority signal sending operation unit 5 receives instructions from the network control operation unit 8 and delivers priority information to a control information communicating channel (as designated by arrows in FIG. 2) by a predetermined means.

The priority signal receiving operation unit 6 monitors the information on the control information communicating channel and, when it receives a connect request signal from the opposed station, the priority signal receiving operation unit 6 selectively receives (i.e., extracts) priority information from the connect request signal received from the opposed station which produced the connect request and then delivers the extracted priority information to the priority signal determining operation unit 7.

The priority signal determining operation unit 7 determines a priority, or sequence, based on the intra-office station priority information and the priority information of the opposed station which produced the connect request signal and then supplies a result signal (i.e., the result of the priority determination) to the network control operation unit 8.

The network control operation unit 8 communicates with the ISDN network 1 via the network interface operation unit 3 by transmitting and receiving the network control information which is necessary to carry out network control (that is, network interface operation unit 3 performs exchange control of outgoing and incoming signals). At the same time, when a connect request signal is sent, (i.e., in the case of outgoing signals), the network control operation unit 8 instructs the priority signal sending operation unit 5, such that an intra-office station priority signal is transmitted to the opposed station with which a connection is to be effected, in accordance with the connect request signal, during the connect request signal and before an answer from the connection-requested opposed station is returned thereto. When a connect request signal from a connect requesting opposed station is incoming, the network control operation unit 8 determines that a collision of the outgoing and incoming request signals has occurred. Based on a result of the decision from the priority signal determining operation unit 7, if the intra-office station priority is lower than the priority of the connect requesting station, the network control operation unit 8 withdraws the connect request of the inter-office station and carries out network control in accordance with the connect request signal from the connect requesting opposed station.

In accordance with the calls collision sidestep device of the present invention, therefore, each communication equipment unit supplies intra-office station priority information relative to a connect requesting station (i.e., the data terminal equipment 2), in response to and during the connect request signal therefrom, requesting an outgoing call and, if a collision of an incoming call with the outgoing call occurs, the device determines the connection priority between the intra-office station (i.e., the data terminal equipment 2) and the opposed station which produced the incoming call; in accordance with the priority determination as above, in which the intra-office station (i.e., data terminal equipment 2) has the lower priority, the outgoing connect request thereof is withdrawn and thereby the incoming and outgoing calls collision state is avoided, thus enabling a rapid connection of the intra-office station (i.e., data terminal equipment 2) to the opposed station, in response to the incoming request from the opposed station. To accomplish this operation:

First, an intra-office number of an originating device is inserted into an originating number intercept information block in a call setup message.

Second, as shown in FIG. 2, priority information is transmitted via another channel, i.e., the control information priority channel, which is independent of the data communication channel.

Third, the above-mentioned independent channel may be made a D-channel packet.

Figure 3:
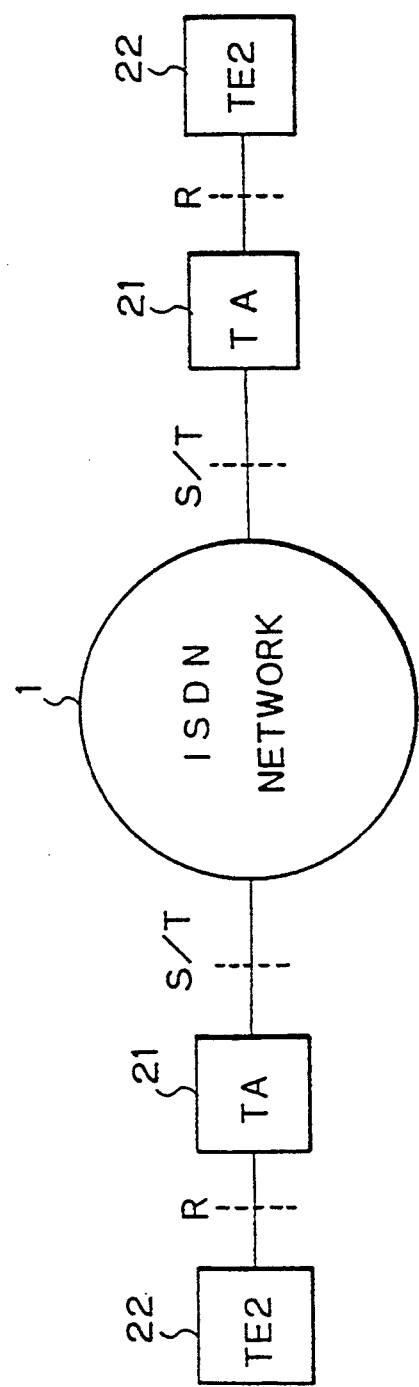
FIG. 3 is a view showing a system configuration of an embodiment in accordance with the present invention.

FIG. 3 is a view showing a system configuration of an embodiment in accordance with the present invention.

S/T and R denote access points to the ISDN network (user network interface) an they are the same as prescribed in CCITT Recommendation I.411. TA and TE2 respectively denote equipment connected to each access point. TA is a terminal adapter and TE2 is terminal equipment which has an existing interface (for example, CCITT Recommendation V.24, V.28) that is not able to be directly connected to the S/T interface.

An ISDN network side portion (a frame configuration on the interface, an assignment of time slots in the frame, a procedure of a network control, and an information transfer procedure in a network, or the like) is the same as prescribed by the I series in the CCITT.

The apparatus with which the present invention is concerned is TA in FIG. 3 and the internal configuration thereof is the same as the exemplary configuration in FIG. 2. A still further detailed description will be give of the concrete functional behavior.

The intra-office priority setup signal holding operation unit 4 holds an intra-office ISDN network number as the intra-office priority setup information, to provide a priority delivery operation unit. (The network number is used as the priority information and thus it is not necessary to set up other priority information). The network number of the terminal equipment is different for each such terminal equipment. Therefore, if the setup does not malfunction, even if the control method is not effected such that the priority information may not be overlapped especially, it is possible to prevent the priority information from duplicating as a result.

The priority signal sending operation unit 5 sends data in a control information communication channel (preferably a D channel as prescribed in CCITT Recommendation I.431) so that the intra-office number information may be inserted, by an instruction from the network control operation unit 8, into a call subscriber number area in a call setup information message sent from the network control operation unit 8. (A preferable format of a call setup message and the coding of information elements are prescribed in the CCITT Recommendation I.451, Q931.) A call subscriber number information element is used with the aim of informing the incoming station of the network number of the outgoing station.

The priority signal receiving operation unit 6 monitors information on the control information communication channel and, when it receives a call setup message, it fetches information from within the call subscriber number area and delivers it to the priority signal determining operation unit 7.

Figure 4:
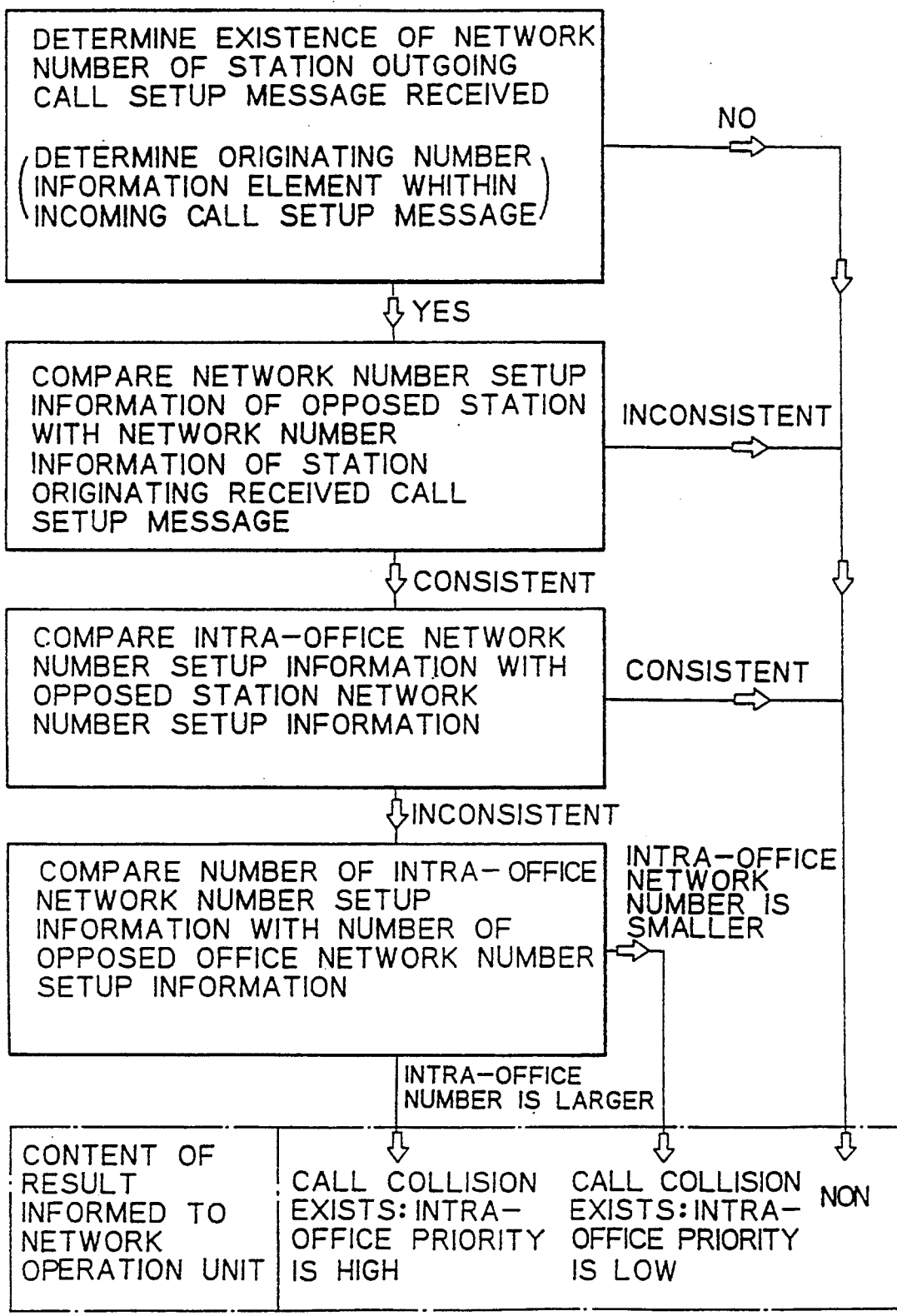
FIG. 4 is a flow chart of a priority determining operation in a call collision sidestep system of the present invention.

Based on the intra-office network number setup information, the opposed station network number setup information (i.e., the network number of the opposed station which is to carry out a connect request from an intra-office station), and a network number information of a station which transmitted, as its outgoing call, the received call setup message (a call subscriber number information of a received call setup message) at the intra-office station, the priority signal determining operation unit 7 decides the respective priorities of the outgoing and incoming calls by the flow chart of FIG. 4 and the result of its priority decision, or determination, is provided to the network control operation unit 8.

The network control operation unit 8 communicates network control information with the ISDN network 1 via the network interface operation unit 3 and carries out network control. ("Network control" means an exchange control of the outgoing and incoming call requests, the detailed sequence and state transition of which are prescribed in CCITT Recommendation Q931, I451) and, at the same time, instructs the priority signal sending operation unit 5, at the time of a call setup sending (outgoing) signal, to insert the intra-office network number of the intra-office sending (i.e., requesting station) into the call subscriber number area of the opposed station. When a call setup (incoming) signal is received from a calling station (i.e., an opposed station), and before the calling station receives an answer (an answer message) from a called party to the call setup, based on the result of the determination by the priority signal determining operation unit 7, network control is carried out by network control operation unit 8. In this manner, if a call collision occurs, when the priority of the intra-office station is higher than that of the opposed (calling) station, the incoming signal is neglected. When a call collision occurs and the priority of the intra-office station is lower than that of the opposed station, a release message is sent to cancel an outgoing call request from the intra-office station to the opposed station (i.e., the intra-office outgoing connect request signal is withdrawn) and an answer message is sent to the opposed station, in response to the incoming connect request signal from an opposed station (i.e., a connect answer is sent to the opposed station in response to the incoming connect request from that opposed station).

I claim:

1. A method of controlling a network comprising first and second terminals connected to the network, wherein a call collision state exits when the first terminal transmits a corresponding connect request to the network for connection to the second terminal while, simultaneously, the second terminal transmits a corresponding connect request to the network for connection to the first terminal, the method, during a call collision state, comprising the steps of:

withdrawing from the network the corresponding connect request of one of the first and second terminals while maintaining the corresponding connect request of the other of the first and second terminals;

transmitting connect request information from the network to the one of the first and second terminals for which the connect request is withdrawn, the connect request information corresponding to the connect request of the one of the first and second terminals for which a connect request is maintained;

receiving, by the one of the first and second terminals for which the connect request information is withdrawn, the connect request information;

transmitting a connect allowance signal to the network from the one of the first and second terminals for which the connect request is withdrawn;

transmitting, from the network to the one of the first and second terminals for which the connect request is maintained, connect allowance information corresponding to the connect allowance signal; and connecting the first terminal and the second terminal together through the network.

2. A method as in claim 1, wherein the connect requests corresponding to the first terminal and the second terminal, respectively, each include a respective identifier and a priority, based on the respective identifiers, is used to determine which of the respective connect requests to withdraw.

3. A method of controlling a network as in claim 1, wherein, when a call collision state does not occur, the method comprising the steps of:

transmitting, from the first terminal to the network, a corresponding connect request which includes an identifier of the first terminal and an identifier of the second terminal;

transmitting, from the network to the second terminal, connect request information relating to the connect request of the first terminal, the connect request information including the identifier of the first terminal;

receiving, by the second terminal from the network, the connect request information;

transmitting a connect allowance signal from the second terminal to the network;

transmitting connect allowance information, relating to the connect allowance signal, from the network to the first terminal; and connecting the first terminal and the second terminal together through the network.

* * * * *